(12) United States Patent
Zhao et al.

(10) Patent No.: US 9,405,150 B2
(45) Date of Patent: Aug. 2, 2016

(54) BACKLIGHT MODULE FITTING PLATFORM

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Ri Zhao, Beijing (CN); Wei Dai, Beijing (CN); Fangqing Li, Beijing (CN); Lei Wu, Beijing (CN); Yizhao Chen, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 222 days.

(21) Appl. No.: 14/472,268

(22) Filed: Aug. 28, 2014

(65) Prior Publication Data
US 2015/0362800 A1    Dec. 17, 2015

(30) Foreign Application Priority Data
Jun. 11, 2014  (CN) .......................... 2014 2 0310816

(51) Int. Cl.
*F21V 7/04*  (2006.01)
*G02F 1/1335*  (2006.01)

(52) U.S. Cl.
CPC ................................ *G02F 1/133608* (2013.01)

(58) Field of Classification Search
CPC ................................................. G02F 1/133608
See application file for complete search history.

(56) References Cited

U.S. PATENT DOCUMENTS

| | | | |
|---|---|---|---|
| 7,461,958 B2 * | 12/2008 | Takata | F21V 19/009 349/60 |
| 2011/0199754 A1 * | 8/2011 | Hasegawa | F21V 19/009 362/97.1 |
| 2013/0258687 A1 * | 10/2013 | Huang | F21V 21/00 362/432 |

* cited by examiner

*Primary Examiner* — Ali Alavi
(74) *Attorney, Agent, or Firm* — Blakely Sokoloff Taylor & Zafman LLP

(57) ABSTRACT

The present disclosure relates to a technical field of display, and discloses a backlight module fitting platform. The backlight module fitting platform includes a primary platform and a number of first supporting pads located at a surface of the primary platform for supporting the backlight module. The backlight module fitting module further includes a lifting mechanism connected to the first supporting pad and supporting each of the first supporting pads to rise and fall independently. According to the backlight module fitting platform of the present disclosure, independent rise and fall of each of the first supporting pads is adjusted via the lifting mechanism so that the backlight module fitting platform is adapted for fitting of even-back and uneven-back backlight modules and can stably support and fit the backlight modules.

11 Claims, 4 Drawing Sheets

BACKLIGHT MODULE FITTING PLATFORM

BACKGROUND OF THE DISCLOSURE

1. Field of the Disclosure

The present disclosure relates to the technical field of display, and particularly to a backlight module fitting platform.

2. Description of the Prior Art

Currently, a liquid crystal display is dimensioned larger and larger, accordingly, a back of a corresponding backlight module is structured distinctly. The back of the backlight module might be even or uneven (a large-dimension display needs to be hung on a wall and the back of the backlight module usually has a protruding bracket), so an automatic assembling apparatus cannot cater to backlight modules with different structures simultaneously. As shown in FIG. 8, a backlight module 120 with an uneven back is placed on a fitting platform 110, which causes unsteady placement and makes the backlight module and a panel fitting surface unparallel and finally affects the fitting effect.

SUMMARY OF THE DISCLOSURE

A technical problem to be solved by the present disclosure is how to enable a backlight module fitting module to stably support the backlight module.

To solve the above technical problem, the present disclosure provides a backlight module fitting platform, comprising a primary platform and a plurality of first supporting pads located at a surface of the primary platform for supporting the backlight module. The backlight module fitting module further comprises a lifting mechanism connected to the first supporting pad and supporting each of the first supporting pads to rise and fall independently.

According one aspect of the disclosure, the lifting mechanism is located in the primary platform and includes a number of independent first lifters, each of which is disposed below each first supporting pad.

According one aspect of the disclosure, the first supporting pads are vacuum suction pads.

According one aspect of the disclosure, the backlight module fitting platform further comprises at least one secondary platform detachably connected to the primary platform, and a surface of the secondary platform is provided with a plurality of second supporting pads for supporting the backlight module.

According one aspect of the disclosure, a second lifter is disposed below each of said second supporting pads to support the second supporting pad to rise and fall.

According one aspect of the disclosure, the surface of the primary platform provided with the first supporting pads is lower than the surface of the secondary platform provided with the second supporting pads.

According one aspect of the disclosure, the second supporting pads are vacuum suction pads.

According another aspect of the disclosure, the backlight module fitting platform comprises four secondary platforms located around the primary platform respectively.

According yet another aspect of the disclosure, the four secondary platforms are disposed centrosymmetrically.

According to the backlight module fitting platform of the present disclosure, independent rise and fall of each of the first supporting pads is adjusted via the lifting mechanism so that the backlight module fitting platform is adapted for fitting of even-back and uneven-back backlight modules and can stably support and fit the backlight modules.

DETAILED DESCRIPTION OF THE PRESENT DISCLOSURE

Specific embodiments of the present disclosure will be described below in further detail with reference to figures and embodiments. The following embodiments are used to illustrate the present disclosure, not to limit the scope of the present disclosure.

Figure 1:
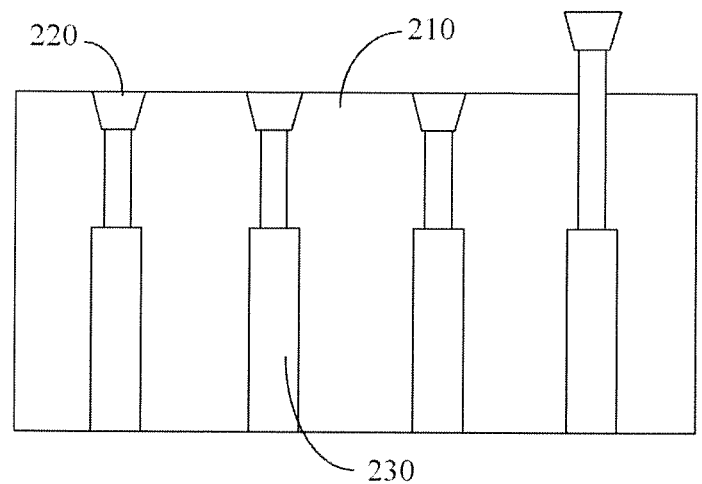
FIG. 1 is a structural schematic view of a backlight module fitting platform according to an embodiment of the present disclosure.

As shown in FIG. 1, an embodiment of the present disclosure provides a backlight module fitting platform, comprising a primary platform 210 and a plurality of first supporting pads 220 located at a surface of the primary platform 210 for supporting the backlight module. In order to ensure a backlight module with an uneven back can be steadily fitted, the backlight module fitting module further comprises a lifting mechanism connected to the first supporting pad 220 and supporting each of the first supporting pads 220 to rise and fall independently.

According to the backlight module fitting platform of the present embodiment, rise and fall of each of the first supporting pads is adjusted via the lifting mechanism, a whole back of the backlight module having an uneven back is enabled to receive an even force by adjusting height of part of the first supporting pads so that the backlight module fitting platform is adapted for fitting of even-back and uneven-back backlight modules and can stably support and fit the backlight modules.

In the present embodiment, the lifting mechanism enabling the first supporting pad 220 to rise and fall independently is located in the primary platform, a plurality of independent first lifters 230 may be provided in the primary platform 210, each of the first lifters 230 is disposed below each first supporting pad 220 at the surface of the primary platform 210. Certainly, it is also feasible to dispose the first lifter 230 below only part of the first supporting pads 220, and not to dispose the first lifter 230 below the remaining part of the first supporting pads 220. The first lifter 230 may be any kind of lifter in the prior art that can control the lifting height precisely.

Furthermore, to better support the backlight module, the first supporting pad 220 is a vacuum suction pad to more firmly grip the back of the backlight module to avoid occurrence of transverse displacement.

Figure 2:
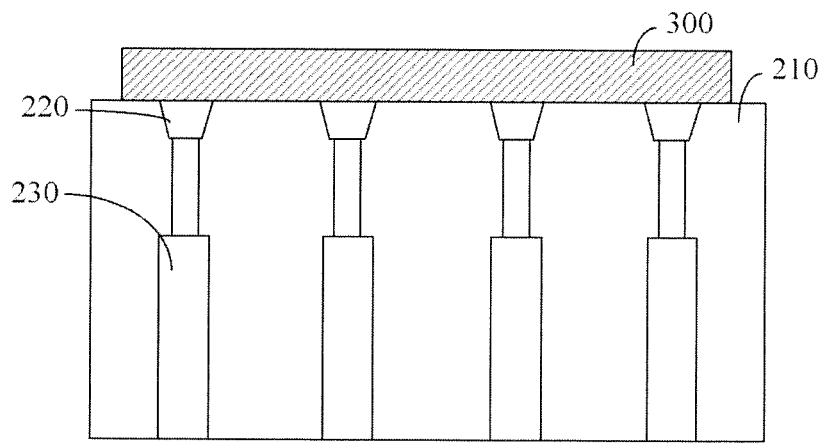
FIG. 2 is a schematic view illustrating that a backlight module with an even back is placed on a primary platform of the fitting platform in FIG. 1.
Figure 3:
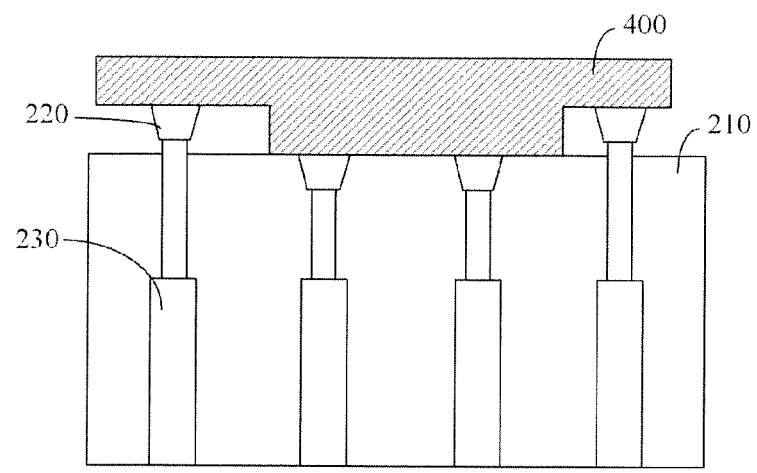
FIG. 3 is a schematic view illustrating that a backlight module with an uneven back is placed on the primary platform of the fitting platform in FIG. 1.

As shown in FIG. 2, a backlight module 300 having an even back may be directly placed on the first supporting pads 220. As shown in FIG. 3, regarding a backlight module 400 having an uneven back, since the first lifters 230 may adjust independent rise and fall of the first supporting pads 220, part of the first supporting pads 220 which, before being lifted, cannot directly contact the back of the backlight module 400 are lifted via the first lifters 230 to support the back of the backlight module so that the whole back of the backlight module 400 receives an even force and achieves steady and firm fitting.

Figure 4:
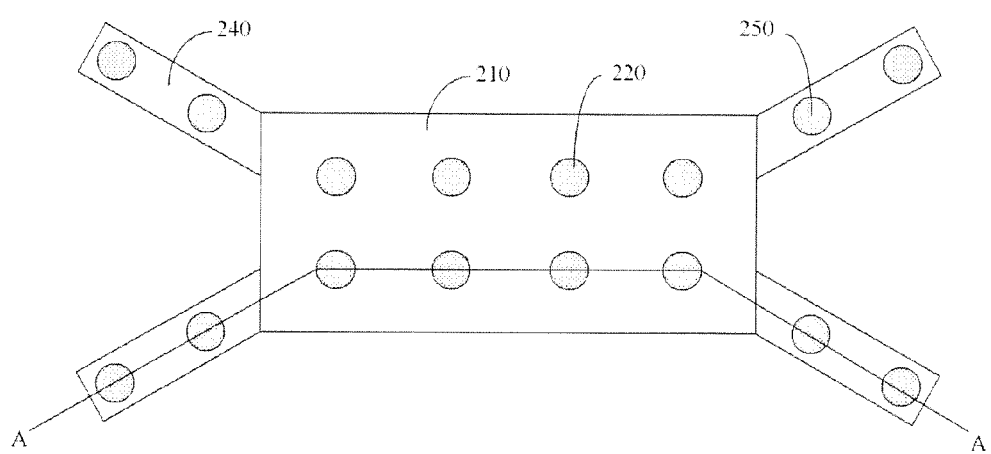
FIG. 4 is a top view of another backlight module fitting platform according to an embodiment of the present disclosure.
Figure 5:
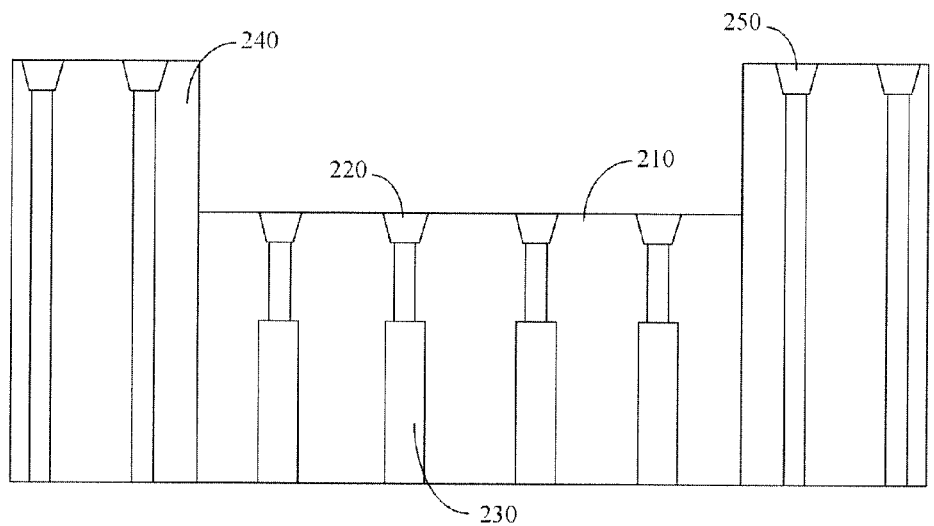
FIG. 5 is a sectional view of the backlight module fitting platform of FIG. 4 taken along a ling A-A.

Usually a display panel is dimensioned in a range of 7-17.3 inches, so, for the sake of occupation of space on a production line, a dimension of the above primary platform 210 is only slightly larger than 17.3 inches. However, some panels with a larger dimension (which exceeds the dimension of the primary platform) are customized sometimes, whereupon the primary platform 210 obviously cannot better support the backlight modules corresponding to the larger-dimension panels. Therefore, the backlight module fitting platform may further comprise at least one secondary platform 240 detachably connected to the primary platform 210, as shown in FIG. 4 and FIG. 5. A surface of the secondary platform 240 is provided with a plurality of second supporting pads 250 for supporting the backlight module. Upon fitting the backlight module with a larger-dimension panel, said at least one secondary platform 240 may be fixed on one side of the primary platform 210 so that the backlight module fitting module supports and fits the backlight module with a larger-dimension panel.

In the present embodiment, in order to stably support the large-dimension backlight module having an uneven back, a second lifter is disposed below each second supporting pad 250 at the surface of the secondary platform 240 to support the second supporting pad 250 to rise and fall (the second lifter may be identical with the first lifter in structure).

Since a protrusion of a back of the backlight module is usually at a middle position thereof, preferably, as shown in FIG. 5, the surface of the primary platform 210 provided with the first supporting pads 220 is lower than the surface of the secondary platform 240 provided with the second supporting pads 250. As such, for the backlight module having the uneven back, the second lifters need not be provided in the secondary platform 240, thereby saving the manufacturing cost.

Furthermore, the second supporting pads 250 are vacuum suction pads.

In order to better support the backlight module with a large-dimension panel, according to the embodiment as shown in FIG. 4, there are four secondary platforms 240 located around the primary platform 210 respectively. Preferably, the four secondary platforms 240 are disposed centrosymmetrically to allow the backlight module to receive an evener force.

Figure 6:
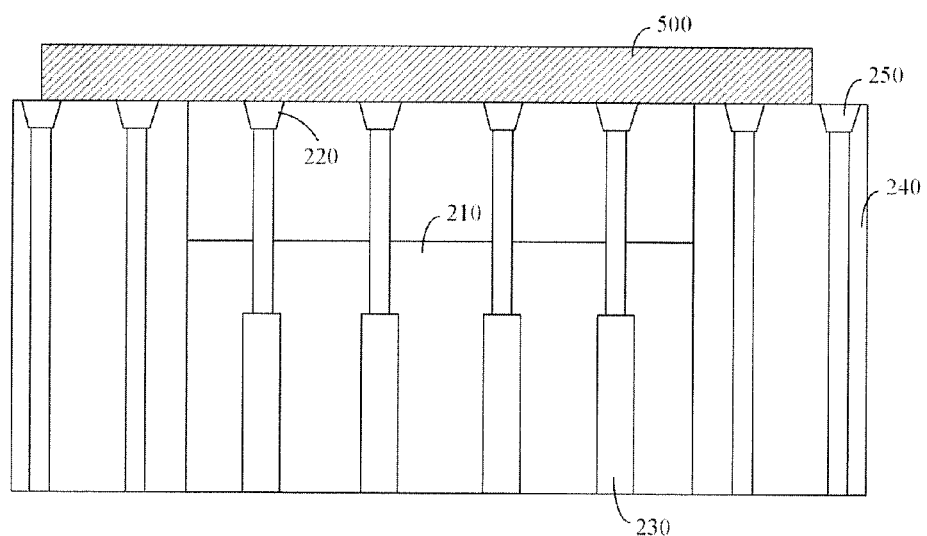
FIG. 6 is a schematic view illustrating a backlight module having a size larger than that of a primary platform and having an even back is placed on the primary platform and secondary platform of the fitting platform of FIG. 5.
Figure 7:
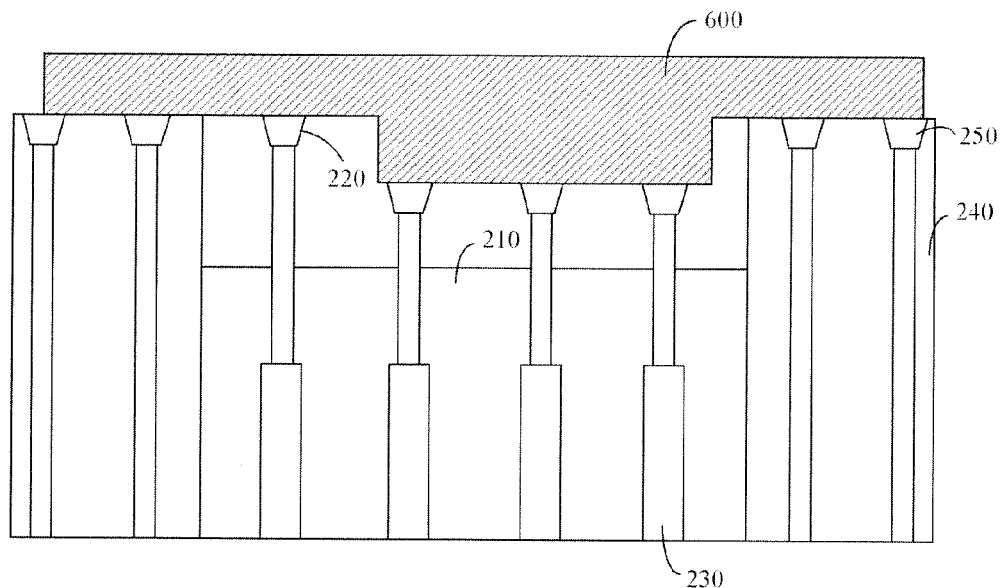
FIG. 7 is a schematic view illustrating a backlight module having a size larger than that of a primary platform and having an uneven back is placed on the primary platform and secondary platform of the fitting platform of FIG. 5.
Figure 8:
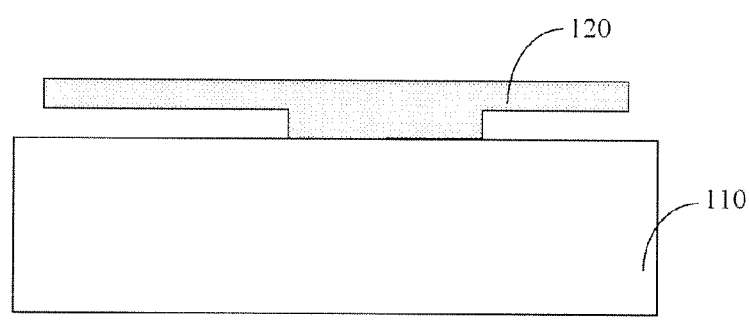
FIG. 8 is a structural schematic view of a backlight module fitting platform in the prior art.

As shown in FIG. 6, the first supporting pads 220 at the primary platform 210 are lifted by the first lifters 230 to a plane where the second supporting pads 250 of the secondary platform 240 lie, and then a large-dimension backlight module 500 with an even back is placed on the plane formed by the first supporting pads 220 and the second supporting pads 250. As shown in FIG. 7, the lift height of the first supporting pads 220 at the primary platform 210 might vary with a large-dimension backlight module 600 with an uneven back.

The above embodiments are only intended to illustrate the present disclosure, not to limit the present disclosure. Those having ordinary skill in the art may make diverse variations and modifications without departing from the spirit and scope of the present disclosure. Therefore, all equivalent technical solutions fall within the category of the present disclosure and the protection scope of the present disclosure should be defined by the appended claims.

The invention claimed is:

1. A backlight module fitting platform, comprising a primary platform and a plurality of first supporting pads located at a surface of the primary platform for supporting the backlight module, characterized in that the backlight module fitting module further comprises a lifting mechanism connected to the first supporting pad and supporting each of the first supporting pads to rise and fall independently.

2. The backlight module fitting platform according to claim 1, characterized in that the lifting mechanism is located in the primary platform and comprises a plurality of independent first lifters, each of which is disposed below each first supporting pad.

3. The backlight module fitting platform according to claim 1, characterized in that, the first supporting pads are vacuum suction pads.

4. The backlight module fitting platform according to claim 1, characterized in that, the backlight module fitting platform further comprises at least one secondary platform detachably connected to the primary platform, and a surface of the secondary platform is provided with a plurality of second supporting pads for supporting the backlight module.

5. The backlight module fitting platform according to claim 4, characterized in that, a second lifter is disposed below each of said second supporting pads to support the second supporting pad to rise and fall.

6. The backlight module fitting platform according to claim 4, characterized in that, the surface of the primary platform provided with the first supporting pads is lower than the surface of the secondary platform provided with the second supporting pads.

7. The backlight module fitting platform according to claim 4, characterized in that, the second supporting pads are vacuum suction pads.

8. The backlight module fitting platform according to claim 4, characterized in that, the backlight module fitting platform comprises four secondary platforms located around the primary platform respectively.

9. The backlight module fitting platform according to claim 8, characterized in that, the four secondary platforms are disposed centrosymmetrically.

10. The backlight module fitting platform according to claim 2, characterized in that, the backlight module fitting platform further comprises at least one secondary platform detachably connected to the primary platform, and a surface of the secondary platform is provided with a plurality of second supporting pads for supporting the backlight module.

11. The backlight module fitting platform according to claim 3, characterized in that, the backlight module fitting platform further comprises at least one secondary platform detachably connected to the primary platform, and a surface of the secondary platform is provided with a plurality of second supporting pads for supporting the backlight module.

* * * * *